3,160,516
PROCESS FOR RENDERING LINEAR POLYESTER FIBERS ADHERENT TO POLYMERS OF VINYL CHLORIDE
Nicole Beaufils, Paris, and Yvan Landler, Sceaux, France, assignors, by direct and mesne assignments, to Pneumatiques Caoutchouc Manufacture et Plastiques Kleber Colombes, also known as Kleber Colombes
No Drawing. Filed Oct. 25, 1961, Ser. No. 147,468
Claims priority, application France, Nov. 3, 1960, 843,096, Patent 1,278,749; Nov. 3, 1960, 843,097, Patent 1,278,750
3 Claims. (Cl. 117—76)

It has already been proposed to treat polyesters by an aqueous dispersion comprising principally a copolymer of butadiene-styrene acrylonitrile with a large or small proportion of polyvinyl chloride and other ingredients.

This process has been applied to polyesters in the form of transparent and glossy films which have been coated with this mixture, to allow films thus treated to be set in the hot state, so that they may be joined one to the other for example to make up packing materials.

The present invention has for an object rendering linear polyester fibres adherent to polyvinyl chloride, said polyesters comprising the esters of terephthalic acid and a glycol of the series $HO=(CH_2)_n=OH$ (where $n$ varies between 2 and 10) and more particularly the terephthalate of ethylene glycol known under the trademark "Tergal."

In addition to the method of treatment defined above, the invention also provides the fibres and fabrics treated by this method and assemblies of these fibres or fabrics with polyvinyl chloride.

The properties of these synthetic polyester fibres so far as their hydrophobic nature, their chemical inertness, their thermal stability and their small extensibility are concerned, opens up to them a very important field of use in the form of woven or non-woven fabrics as reinforcing elements for assemblies, with polyvinyl chloride. However, the lack of adherence between these fibres and polyvinyl chloride has hitherto limited their use.

There has now been discovered a treatment enabling an adherent coating of polyvinyl chloride or vinyl chloride copolymer to be made on linear polyester fibres.

This method, which forms the object of the present invention, consists in treating woven or non-woven synthetic polyester fibres or monofilaments with an aqueous dispersion comprising on the one hand 40 to 95%, and particularly from 50 to 70% of polyvinyl chloride or its copolymers containing a quantity at least equal to 80% of vinyl chloride and, on the other hand, 5 to 60% by weight and more particularly 30 to 50% by weight with reference to the total weight of the solids entering into the composition of the mixture, of an interpolymer prepared by the polymerisation of a mixture of monomers comprising approximately from 34 to 38% by weight of butadiene-1,3, approximately 29 to 39% of monomer chosen from styrene and the series of alkyl- and chlorostyrenes substituted in α or on the nucleus, and approximately 27 to 33% of acrylonitrile.

Finally the mixture deposited on the fabrics is dried for example by exposure to a temperature varying between 100° C. to 210° C., and preferably 170° C., in order to obtain a coating up to approximately 150 gms./m.² but preferably between 50 to 100 gms.

The fibres thus treated are assembled with a mixture based on polyvinyl chloride or one of its copolymers which contains at least 80% by weight of vinyl chloride, this mixture having a given composition following the desired rigid or flexible form and according to the conditions under which the polyvinyl chlorides will be used.

In accordance with a particular embodiment of the invention the process described above is used for the reinforcement of a belt, which may be a conveyor belt. The fabric reinforcement, which may be twilled if desired, made from polyester elements, is immersed in the mixture defined above and dried at a temperature of between 100° C. and 210° C., preferably 170° C. The coating which is deposited may weigh up to 150 g./m.², but the best results have been obtained with coatings of from 50 to 100 g./m.².

In order that the invention may be more clearly understood reference will now be made to the specific example herebelow.

The adherence is measured by the separation force required between the fabric and the polyvinyl chloride, both of these being held in the jaws of a dynamometer.

Example 1

A fabric of "Tergal" material woven from monofilaments and weighing about 750 g./m.² is immersed in an aqueous dispersion containing by weight, with reference to the total quantity of the solid, on the one hand 25 to 100% of polyvinyl chloride (Gobinyle 550 latex) and on the other hand from 0 to 75% of an interpolymer of butadiene-1,3, styrene and acrylonitrile (Hycar 1577 latex). It is dried for 20 minutes at a temperature of 170° C. The deposit obtained is 75 g./m.².

The mixture based on polyvinyl chloride utilised in the assembly is a paste of the following composition: "Afcovyl 513" homogenised with an equal quantity of tricresylphosphate with 1.5% by weight of lead stearate, with reference to the total weight. This paste is gelled on the treated fabric and the assembly is moulded at 170° C. under slight pressure.

The adherence between the "Tergal" and polyvinyl chloride is given in the following table as a function of the quantity of polyvinyl chloride entering into the aqueous dispersion (drawing speed of the dynamometer: 180 mm./minute).

| | Polyvinyl chloride "Gobinyle" | Copolymer of butadiene-styrene-acrylonitrile "Hycar 1577 Latex" | Adherence, kg./cm. |
|---|---|---|---|
| (1) | 0 | 0 | 1.7 |
| (2) | 25 | 75 | 3 |
| (3) | 35 | 65 | 3.5 |
| (4) | 50 | 50 | 4–4.5 |
| (5) | 60 | 40 | 4.5–5 |
| (6) | 70 | 30 | 3.5–4 |
| (7) | 75 | 25 | 3.85 |
| (8) | 80 | 20 | 3.8 |
| (9) | 85 | 15 | 3.7 |
| (10) | 95 | 5 | 3–3.5 |
| (11) | 100 | 0 | 2.2 |

In the result, the process gives good adherence between Tergal fabric and polyvinyl chloride better than 3.5 kg./cm. for aqueous dispersions Nos. 3 to 10 containing from 40 to 95% by weight with reference to the total weight of the solids entering into the mixture, and more particularly from 50 to 70%, of polyvinyl chloride, on the one hand and from 5 to 60%, preferably from 30 to 50% of the butadiene-1,3 styrene-acrylonitrile copolymer on the other hand.

Example 2

A monofilamentary Tergal fabric weighing approximately 750 g./m.² was treated under these conditions with a mixture having a dry extract composition as follows: 60 parts polyvinyl chloride of 50% dry extract, 40 parts butadieneacrylonitrile-styrene copolymer of 40% dry extract.

The drying was effected at 170° C. for 20 minutes and the deposit obtained was 75 g./m.².

The fabric thus treated was utilised as the carcass of a conveyor belt. The polyvinyl chloride was coated on to the fabric in the form of a paste containing 60 to 80 parts of plasticiser for 100 parts of polyvinyl chloride. A part of the fabric is protected by any kind of film so as to maintain separation between the fabric and the polyvinyl chloride and so that each of them may be separately gripped in the jaws of a dynamometer.

Gelling is produced at a temperature of 150° C. for 10 minutes and the moulding is effected under light pressure at 185° C. for 10 minutes with cooling at a higher pressure.

The adherence expressed as kilograms per centimetre is from 5 kg./cm. with the adhesion treatment described: it is from 1.75 kg./cm. without adhesion.

We claim:

1. In a process for coating linear polyester fibres with a polymeric substance selected from the group consisting of polyvinyl chloride and copolymers containing at least 80% by weight of vinyl chloride, the steps of:
    (a) treating said linear polyester fibres with an aqueous dispersion comprising 40 to 95% by weight of total solids of a polymeric substance selected from the group consisting of polyvinyl chloride and copolymers containing at least 80% by weight of vinyl chloride, and 5 to 60% by weight of total solids of an interpolymer prepared by the polymerisation of a mixture of monomers comprising approximately 34–38% by weight of 1,3-butadiene, approximately 29–39% of a monomer selected from the group consisting of styrene, alkylstyrene and chlorostyrene, and approximately 27–33% acrylonitrile;
    (b) drying said treated linear polyester fibres at a temperature in the range of 100 to 210° C. and
    (c) coating said linear polyester fibres with a polymeric substance selected from the group consisting of polyvinyl chloride and copolymers containing at least 80% by weight of vinyl chloride.

2. A process as claimed in claim 1, in which said linear polyester fibres consist of fibres of polyethylene terephthalate.

3. In a process for coating polyethylene terephthalate fibres with a polymeric substance selected from the group consisting of polyvinyl chloride and copolymers containing at least 80% by weight of vinyl chloride, the steps of:
    (a) treating said linear polyester fibres with an aqueous dispersion comprising 50 to 70% by weight of total solids of a polymeric substance selected from the group consisting of polyvinyl chloride and copolymers containing at least 80% by weight of vinyl chloride, and 30 to 50% by weight of total solids of an interpolymer prepared by the polymerisation of a mixture of monomers comprising approximately 34–38% by weight of 1,3-butadiene, approximately 29–39% of a monomer selected from the group consisting of styrene, alkylstyrene and chlorostyrene, and approximately 27–33% acrylonitrile;
    (b) drying said treated linear polyester fibres at a temperature in the range of 100 to 210° C., and
    (c) coating said linear polyester fibres with a polymeric substance selected from the group consisting of polyvinyl chloride and copolymers containing at least 80% by weight of vinyl chloride.

References Cited in the file of this patent

UNITED STATES PATENTS 2,874,069    Gagarine _____ Feb. 17, 1959